(12) United States Patent
Arponen et al.

(10) Patent No.: US 9,795,878 B2
(45) Date of Patent: Oct. 24, 2017

(54) CONFIGURATION FOR NONLINEAR GAMEPLAY

(71) Applicant: PALRINGO LIMITED, Cramlington, Northumberland (GB)

(72) Inventors: Ville Kalle Arponen, Helsinki (FI); Timo Kämäräinen, Helsinki (FI)

(73) Assignee: QUICKSAVE INTERACTIVE OY, Helsinki (FI)

( * ) Notice: Subject to any disclaimer, the term of this patent is extended or adjusted under 35 U.S.C. 154(b) by 112 days.

(21) Appl. No.: 14/411,693

(22) PCT Filed: Jun. 26, 2013

(86) PCT No.: PCT/FI2013/050702
§ 371 (c)(1),
(2) Date: Dec. 29, 2014

(87) PCT Pub. No.: WO2014/001639
PCT Pub. Date: Jan. 3, 2014

(65) Prior Publication Data
US 2015/0190712 A1    Jul. 9, 2015

(30) Foreign Application Priority Data
Jun. 29, 2012  (FI) ...................................... 20125762

(51) Int. Cl.
*A63F 13/12* (2006.01)
*A63F 13/35* (2014.01)
(Continued)

(52) U.S. Cl.
CPC .............. *A63F 13/35* (2014.09); *A63F 13/47* (2014.09); *A63F 13/60* (2014.09); *A63F 13/69* (2014.09);
(Continued)

(58) Field of Classification Search
USPC .......................................................... 463/42
See application file for complete search history.

(56) References Cited

U.S. PATENT DOCUMENTS 6,106,399 A    8/2000  Baker et al.
2002/0151338 A1  10/2002  Taguchi
(Continued)

FOREIGN PATENT DOCUMENTS

WO  WO 2005/115570 A2  12/2005

OTHER PUBLICATIONS

International Search Report dated Oct. 24, 2013 corresponding to International Patent Application No. PCT/FI2013/050702.
(Continued)

*Primary Examiner* — Pierre E Elisca
(74) *Attorney, Agent, or Firm* — Squire Patton Boggs (US) LLP (57) ABSTRACT

An improved computer implemented process for providing an interactive game event for two or more users. A game event is configured to comprise one or more independently progressing sub-processes (SP1-SP6) into which groups of game characters (C1-C3) are selected. Selected game characters (C1-C3) are provided with a set of allowed interaction functions for activation in the sub-process (SP1-SP6). The state of the sub-process (SP1-SP6) is changed in response to a game character (C1-C3) activating an interaction function from the set of allowed interaction functions, and the set of allowed interaction functions of the game characters (C1-C3) is updated in response to state change of the sub-process (SP1-SP6).

10 Claims, 4 Drawing Sheets (51) Int. Cl.
*A63F 13/60* (2014.01)
*A63F 13/69* (2014.01)
*A63F 13/47* (2014.01)

(52) U.S. Cl.
CPC ............... *A63F 2300/5533* (2013.01); *A63F 2300/5593* (2013.01)

(56) References Cited

U.S. PATENT DOCUMENTS

| | | |
|---|---|---|
| 2002/0169617 A1 | 11/2002 | Luisi |
| 2003/0017439 A1 | 1/2003 | Rapoza et al. |
| 2004/0143852 A1 | 7/2004 | Meyers |
| 2007/0254741 A1 | 11/2007 | Lim et al. |
| 2010/0304814 A1 | 12/2010 | Coleman et al. |
| 2012/0122570 A1* | 5/2012 | Baronoff ............... A63F 13/216 463/31 |
| 2012/0190446 A1 | 7/2012 | Rogers |
| 2014/0295976 A1* | 10/2014 | Purvis .................. A63F 13/655 463/43 |
| 2016/0300446 A1* | 10/2016 | Burgin ................ G07F 17/3239 |

OTHER PUBLICATIONS

PCT International Preliminary Report on Patentability dated Jun. 6, 2014 corresponding to International Patent Application No. PCT/FI2013/050702.
Office Action and Search Report dated Feb. 5, 2013 corresponding to Finnish Patent Application No. 20125762.
Play Chess Online, GameKnot.com [online], Jun. 27, 2012 [retrieved on Sep. 17, 2013] at http://web.archive.org/web/20120627114719/http://gameknot.com/.
Anonymous; "Running Parallel Campaigns", Role-Playing Games—Stack Exchange, May 5, 2012 pp. 1-5.
Anonymous; "C+++—Game Development Story Event Programming", Game Development Stack Exchange, Apr. 1, 2011, pp. 1-3.
Supplementary European Search Report application No. EP13 80 9328 dated Oct. 19, 2016.

* cited by examiner

CONFIGURATION FOR NONLINEAR GAMEPLAY

FIELD OF THE INVENTION

The present invention relates to multiplayer video games, and more specifically to a computer implemented process, an apparatus and a computer program product, as defined in the preambles of the independent claims.

BACKGROUND OF THE INVENTION

In linear gameplay game characters of users are confronted with a predefined sequence of challenges, and a player cannot truly change the storyline or ending of the story. Nonlinear gameplay allows more freedom and permits challenges to be completed in various sequences, side-quests and sub-plots. An extreme version of nonlinear gameplay are open world designs that provide a virtual world where players can almost freely roam for a period they wish.

However, for many people such open world visits do not offer appropriate social sensations; they seek for more shared experiences where a game event would collect players together and then evolve by the actions of all of the participating players. Such games are very rare, because their design is a difficult design challenge. Without proper testing the chances of bugs and absurdities in the storyline of nonlinear games is considerable. In addition, the more players are involved to progress of the storyline, the more complex the structure is, and the more processing resources are needed to perform the required process steps. Conventional technologies have so far not enabled video games that would offer a shared multiplayer game event to the storyline of which all participating users could easily contribute through their game actions.

BRIEF DESCRIPTION OF THE INVENTION

The object of the present invention is to solve or alleviate at least part of the above mentioned problems. The objects of the present invention are achieved with a computer implemented process, an apparatus and a computer program product according to the characterizing portions of the independent claims.

The invention may be implemented as a computer implemented process that provides an interactive game event for two or more users. In the process game characters are allocated to the users, and in the game event one or more sub-processes that are configured to progress independently in separate state machines are initiated. Each of these state machines are responsive to a specific set of interaction functions. A group of game characters is selected to each sub-process such that at least one game character is selected to at least two simultaneously progressing sub-processes. A set of allowed interaction functions are provided for activation to the selected game characters from the specific set of interaction functions of each of the sub-processes they are selected to, and the state of an ongoing sub-process is changed in response to a selected game character activating an interaction function from its set of allowed interaction functions in that ongoing sub-process. The set of allowed interaction functions of the selected game characters in that ongoing sub-process are updated in response to state change of the sub-process.

The invention may also be implemented a game server that comprises a processing unit. The processing unit is configured to allocate game characters to the users, and initiate in the game event one or more sub-processes configured to progress independently in separate state machines, each of which is responsive to a specific set of interaction functions. The processing unit is also configured to select to each sub-process a group of game characters, wherein at least one game character is selected to at least two simultaneously progressing sub-processes. The processing unit is also configured to provide for activation to the selected game characters a set of allowed interaction functions from the specific set of interaction functions of each of the sub-processes they are selected to, and change the state of an ongoing sub-process in response to a selected game character activating an interaction function from its set of allowed interaction functions in that ongoing sub-process. The set of allowed interaction functions of the selected game characters in that ongoing sub-process are updated in response to state change of the sub-process.

The invention may also be implemented as a computer program product, which is readable by a computer and encodes instructions for executing the invented process in a computer device in order to provide an interactive game event for two or more users.

The preferred embodiments of the invention are disclosed in the dependent claims.

The present invention is based on a new game event process configuration that comprises one or more independently progressing sub-processes to which users may participate. In a sub-process a game character of the user has a predefined selection of functions it can activate and the set of activities available to the user in the sub-process changes as the sub-process progresses. By dynamically controlling the available activities, the complexity of a sub-process can be significantly reduced. The modular structure of the game event with independently progressing sub-processes further reduces the complexity.

The new configuration enables provision of multiplayer game events with truly interactive storyline.

BRIEF DESCRIPTION OF THE FIGURES

In the following the invention will be described in greater detail, in connection with preferred embodiments, with reference to the attached drawings, in which.

DETAILED DESCRIPTION OF SOME EMBODIMENTS

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a system architecture in which various embodiments of the invention may be implemented. Only elements relevant for illustrating the embodiments are described in detail. Various implementations of computer implemented processes, apparatuses and computer program products comprise elements that are generally known to a person skilled in the art and may not be specifically described herein.

Figure 1:
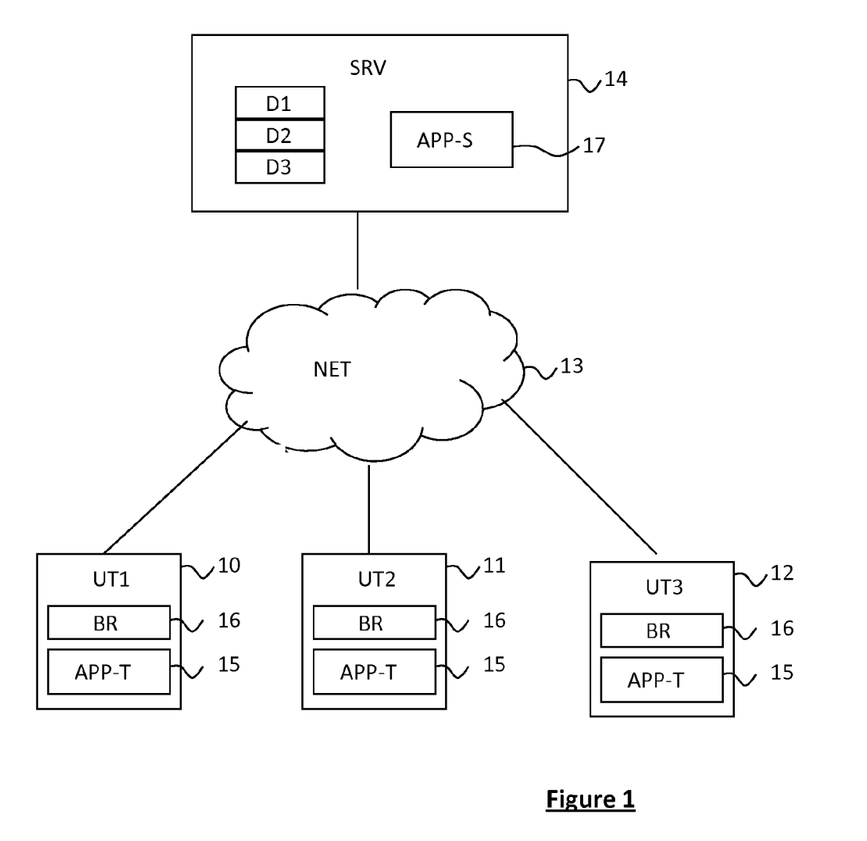
FIG. 1 illustrates an exemplary network system.

FIG. 1 illustrates an exemplary network system in which an embodiment of the present invention may be implemented. The shown network system comprises one or more user terminals 10, 11, 12, a network 13 and a game server 14. The network 13 represents here any combination of hardware and software components that enables a process in one communication endpoint to send or receive information to or from another process in another, remote communication endpoint. The network 13 may be, for example, a personal area network, a local area network, a home network, a storage area network, a campus network, a backbone network, a metropolitan area network, a wide area network, an enterprise private network, a virtual private network, or an internetwork, or a combination of any of these.

At least one of the user terminals 10, 11, 12 comprises a terminal application APP-T 15. The terminal application 15 is a user controllable application that is, or may be stored in a memory of a user terminal and provides instructions that, when executed by a processor unit of the user terminal perform the functions described herein. The expression user-controlled means that the user terminal in which the application is executed comprises a user interface and the user may control execution of the application by means of the user interface. The user may thus initiate and terminate running of the application, provide commands that control the order of instructions being processed in the user terminal.

The at least one of the user terminals 10, 11, 12 comprises also a browser 16 accessible to the user via the user interface UI 15. The user may thus apply the browser 16 to communicate with the game server 14 connected to the network 13. The game server 14 may be a web server that has an IP address and a domain name. The game server 14 may also be implemented as a cloud providing functions of the web server.

Figure 2:
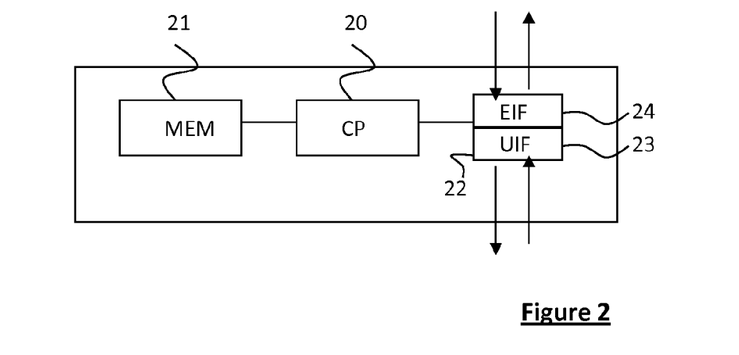
FIG. 2 shows a block diagram illustrating configuration of an exemplary device.

Embodiments of this invention may be implemented with a computer device, applicable as a server described in FIG. 1. FIG. 2 shows a block diagram illustrating configuration of an exemplary device for the purpose.

The device comprises a processor unit 20 for performing systematic execution of operations upon data. The processor unit 20 is an element that essentially comprises one or more arithmetic logic units, a number of special registers and control circuits. Memory unit 21 provides a data medium where computer-readable data or programs, or user data can be stored. The memory unit is connected to the processor unit 20. The memory unit 21 may comprise volatile or non-volatile memory, for example EEPROM, ROM, PROM, RAM, DRAM, SRAM, firmware, programmable logic, etc.

The device may comprise an interface unit 22 with at least one input unit for inputting data to the internal processes of the device and at least one output unit for outputting data from the internal processes of the device. The interface unit 22 of the device may comprise a user interface unit 23 with a keypad, a touch screen, a microphone, and equals for inputting user data and a screen, a touch screen, a loudspeaker, and equals for outputting user data. The interface unit of the device may also comprise a network interface unit 24 that provides means for network connectivity. If a line interface is applied, the network interface unit 24 typically comprises plug-in units acting as a gateway for information delivered to its external connection points and for information fed to the lines connected to its external connection points. If a radio interface is applied, network interface unit 24 typically comprises a radio transceiver unit, which includes a transmitter and a receiver, and is also electrically connected to the processing unit 20. The transmitter of the radio transceiver unit receives a bitstream from the processing unit 20, and converts it to a radio signal for transmission by the antenna. Correspondingly, radio signals received by the antenna are led to the receiver of the radio transceiver unit, which converts the radio signal into a bitstream that is forwarded for further processing to the processing unit 20.

The processor unit 20, the memory unit 21, and the interface unit 22 are electrically interconnected to provide means for systematic execution of operations on received and/or stored data according to predefined, essentially programmed processes of the device. These operations comprise the means, functions and procedures described herein for the application server. The units may exist in one physical element or be networked for distributed operations.

In general, various embodiments of the device may be implemented in hardware or special purpose circuits, software, logic or any combination thereof. Some aspects may be implemented in hardware, while some other aspects may be implemented in firmware or software, which may be executed by a controller, microprocessor or other computing apparatus. Software routines, which are also called as program products, are articles of manufacture and can be stored in any device-readable data storage medium and they include program instructions to perform particular tasks.

While various aspects of the invention have been illustrated and described as block diagrams, message flow diagrams, flow charts and logic flow diagrams, or using some other pictorial representation, it is well understood that the illustrated units, blocks, device, system elements, procedures and methods may be implemented in, for example, hardware, software, firmware, special purpose circuits or logic, a computing device or some combination thereof.

The game server is configured to implement a process that provides an interactive networked game event for a group of at least two users. Advantageously the game is not a mass game but the size of the group limited to a predefined number. Interactive in this context means that the users in the group of users have a two-way communication connection with the game server and the process in the game server is responsive to user commands given via the communication connection. A game refers to a setting for gameplay, and includes definitions of game characters, their background stories, virtual venues, etc. Game definitions brand the game and typically remain unchanged in varying game events. A game event refers here to a process that is set up in the game setting and has defined start and end points. The end may be timed or it may be triggered by a specific state of the game event process. A game event may be made accessible to an unlimited group of users, from which the group of participants may be selected. The game event may thus be repeated for varying user groups without essential changes to the design of the game event.

Figure 3:
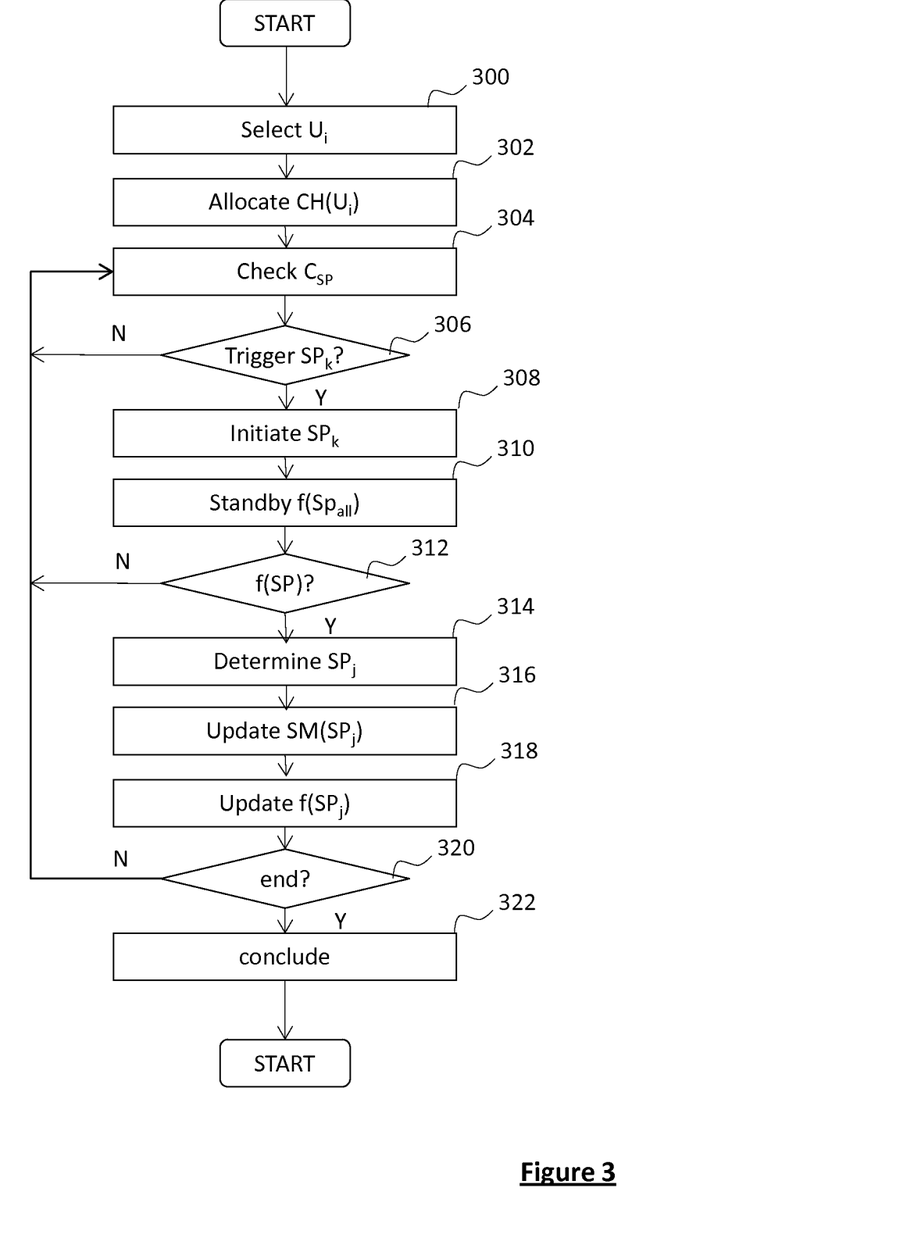
FIG. 3 illustrates an embodiment of a game event process.

The flow chart of FIG. 3 illustrates an embodiment of a game event process according to the invention. In the beginning, a group of users is selected (step 300) to the game event. Advantageously, the game has a registration sub-process by means of which users wishing to participate to the game event may register to one or more upcoming game events. The registration sub-process may also comprise a specific ruleset by means of which the game server may then select participants when the time of initiating a game is at hand. A simple ruleset may arrange users to row according to their time of registration and select users $U_i$ to the group of participants from the top of the row. However, more advanced selection methods may be applied within the scope of the claims.

At game event initiation, the participating users may be provided with game characters (step 302). A game character is a specification that associates a user with a set of character feature parameters, and is valid for the user throughout the game event. In the end of the game event, the game role definitions may be reset such that in any subsequent game event, the user may be allocated the same or a different character, notwithstanding the character he or she had in an earlier game event.

Figure 4:
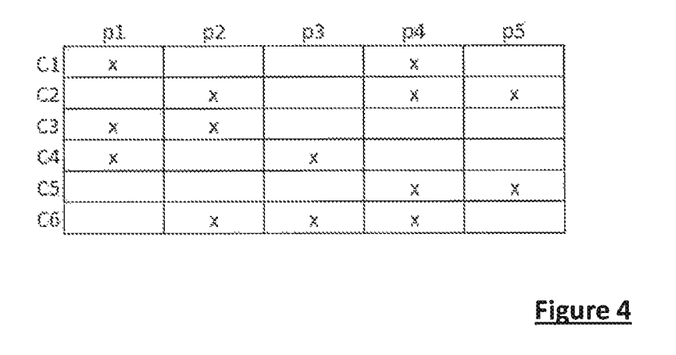
FIG. 4 shows a table with exemplary game character parameter definitions.

Advantageously, a game character has a specific graphical appearance, background story, and characterizing features and capabilities that are matched to the game setting. Features of game characters may be defined by means of game character parameters. Game character parameters may remain unchanged throughout a game event, or some of them may be dynamically changed during the game event to add unpredictability and variation to the episodes. FIG. 4 shows a table that illustrates a simplified example of game character parameter definitions. Rows of the table correspond to roles C1 . . . C6 of the game event, and columns of the table correspond to different game character parameters available for the characters. As may be seen, each character may have one or more features, and characters may share some same features.

It is noted that the number of characters and the number of parameters in FIG. 4 are exemplary only. The game may comprise a number of character definitions and the number of characters, as well as the identity of the characters to be applied in the game event may be decided in the game server at the time of initiation. Advantageously, the game character parameters are based on the game setting. As an example, let us assume that the game is a dramagame where virtual characters walk around in a virtual environment, chat and interact with each other. Game character parameters p1 . . . p5 may then relate to features that could be considered relevant in human interactions, like male/female, beautiful/plain/ugly, rich/poor, environmentalist/technocrat, old/young, etc.

The game event is arranged to comprise a plurality of independently progressing sub-processes, and users may participate to one or more of these sub-processes via their game characters. The game server may comprise a sub-process triggering ruleset $C_{sp}$ that defines varying conditions for initiating sub-processes. For example, sub-processes may be scheduled to occur at a defined point of time, or one sub-process may be triggered when some other sub-process has ended. Sub-processes may thus be related through triggering conditions, but after initiation, a sub-process may progress independently, without interaction with any other sub-process.

Figure 5:
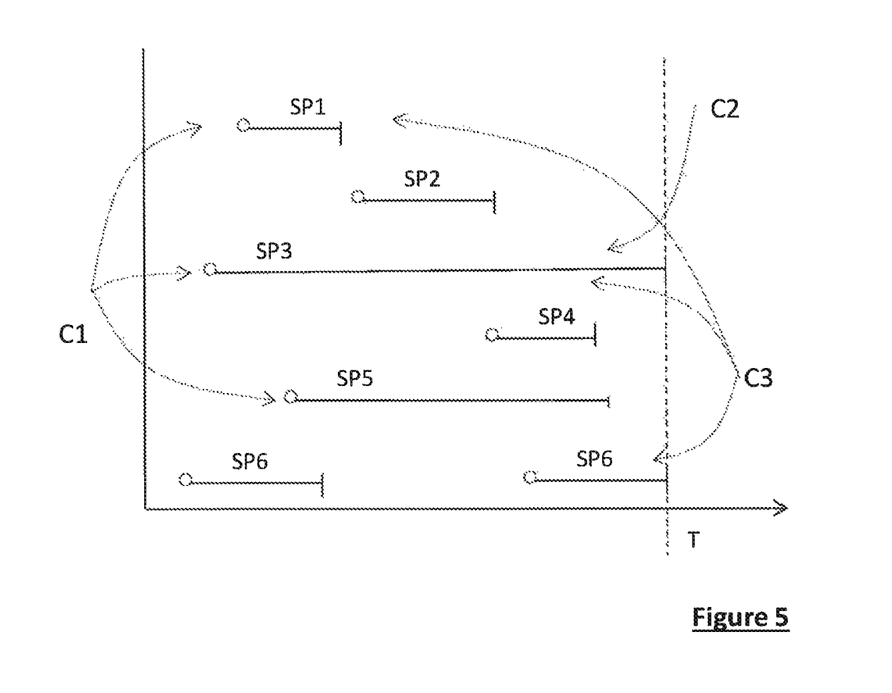
FIG. 5 illustrates a simplified example of a game event with a predefined duration.

FIG. 5 illustrates a simplified example of a game event with a predefined duration T. The game event comprises six sub-processes SP1, SP2, SP3, SP4, SP5, SP6, each of which is initiated at a defined triggering point (denoted with circles) and thereafter progress individually from their internal state to state, without interacting with each other. Some sub-processes (cf. SP6) may be repeated more than one time during the game event. FIG. 5 applies game characters of FIG. 4 to illustrate that the game characters may simultaneously and/or consecutively participate to several (two or more) sub-processes of the game. In FIG. 5, the game character C1 is selected to participate to sub-processes SP1, SP3, and SP5, the game character C2 only to sub-process SP3, and the game character C3 to sub-processes SP1, SP3 and SP6.

Returning back to FIG. 3, when the users are collected and the game characters allocated, the game server is configured to check (step 304) whether any of the rules of the sub-process triggering ruleset $C_{SP}$ is fulfilled. If Yes (step 306), the corresponding sub-process $SP_k$ is initiated (step 308).

A sub-process is a design element of the game event that may involve a predefined group of game roles. At initiation a number of game characters may be selected for these game roles. One game role in a sub-process may be allocated to only one game character, or to a number of game characters. The game characters may be guided or invited to the sub-process via respective user interfaces. This may be implemented in various ways well known to persons skilled in the art. For example, game characters selected to the sub-process may be given announcements telling them a plot, and associated challenges of the sub-process, or they may be guided to sub-plot activities by means of a graphical object in the game scene. A game character may also be involved in a sub-process without the user knowing it. For example, a sub-process may include a challenge for a game role to get signatures to his plea from a group of other game characters. In this sub-process, the challenged game role is invited to complete the task, but the other characters in the signing game role do not need to know about it. However, in a state machine of the sub-process, they are involved as a participating party to the sub-process. Operation of the state machine of the sub-process will be described in more detail later on.

When a game character is included in a sub-process, it gets a game role for the sub-process and is provided with an initial set of interaction functions for activation. Interaction function refers here to a game event operation that the user may activate with a user command. A sub-process may be implemented as a state machine, and the state of the sub-process state machine may be updated when a game character participating to the sub-process activates an interaction function available to it. Accordingly, sub-processes may progress independently in separate state machines, each of which is responsive to a specific set of interaction functions. In order to allow the sub-process plot to progress according to activities of the game characters and still appropriately control meandering of the storyline, also the set of interaction functions available to participating game characters may be updated when the state of the sub-process changes.

Figure 6:
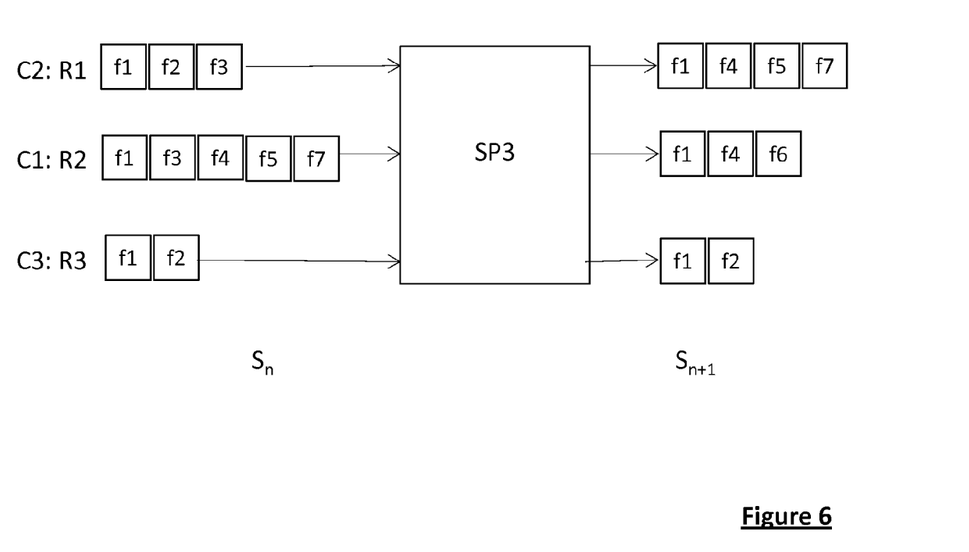
FIG. 6 illustrates an update scheme of a state machine of a sub-process.

FIG. 6 shows a block chart that in a simplistic manner illustrates the update scheme of a state machine of a sub-process with game characters C1, C2, C3 and sub-process SP3 of FIG. 2. As understood by a person skilled in the art, a state machine of the sub-process may also be updated in connection with other functions, for example according to timed or scripted events in the game design. In the beginning of sub-process SP3, the game character C1 gets the game role R2, the game character C2 gets the game role R1, and the game character C3 gets the game role R3. At any state of the sub-process, each of the game characters has a set of interaction functions, which a game character in that game role may activate with a user command. The game roles may be used to preliminarily limit the selection of interaction functions to be made available to game characters in a sub-process. A game character may, however, be treated as an individual instance in the state machine of the sub-process. In FIG. 6, at state $S_n$, functions available to the game character C1 are f1, f2, f3, functions available to the game character C2 are f1, f3, f4, f5, f7, and functions available to the game character C3 are f1, f2. When the game character C2 activates interaction function f2 (textured), the state machine of SP3 progresses to state $S_{n+1}$, and the sets of interaction functions are updated at the same time. At state $S_{n+1}$, functions available to the game character C1 are f1, f4, f5, f7, functions available to the game character C2 are f1, f4, f6 and functions available to the game character C3 are the same as at state $S_n$, i.e. f1, f2.

In the beginning of the sub-process, the game roles of individual game characters may be given objectives that they should try to achieve. All game roles or characters may have different objectives, or at least some game roles or characters may have the same objective. Some objectives may be defined to be contradictory such that when one game character reaches the objective of the game role, one or more of the other ones fails. In the exemplary game setting of FIG. 6, the objective of the game role R1 could be to find out a secret from the game role R3, and the objective of the game role R3 could be to maintain the secret until the end of the game event. The objective of the game role R2 could be to prevent game role R1 from finding out the secret of the game role R3. Such diverse and sometimes even conflicting objectives are enablers that for their part drive user activities during the game event and thereby contribute to an impression of a nonlinearly progressing storyline.

Returning back to FIG. 3, at initiation (step 308) of a sub-process, the game server selects game characters to game roles of the sub-process. The selection may be based on the parameter definitions of the game characters, relevance of the parameter to the story of the sub-plot being considered. After initiation of any of the sub-processes, the game server begins to be standby for user commands requesting activation of an interaction function $f(SP_{all})$ in any of the ongoing sub-processes (step 310). If an interaction function is detected (step 312) the game server may determine the sub-process $SP_j$ to which the interaction function belongs (step 314), and updates the specific state machine $SM(SP_j)$ of the sub-process $SP_j$ (step 316). At the same time, the game server updates the set of interaction functions $f(SP_j)$ that are available to the game characters in the sub-process (step 318). As shown in FIG. 3, initiation of the sub-processes and updates to their state machines and associated updates to the interaction function sets may continue until the end of the game event (step 320). As discussed above, the end may be timed, or triggered by some state or activity of a sub-process. In the end of the game event, the game event may compile from the states of the state machines of the sub-processes, and other recorded or predesigned materials a summary report (step 322) on episodes and incidents that took place during the game event. This report may be provided to the users in form of a game event storyline description.

Let us consider an example of a sub-process in a dramagame, a web service running on a service platform. In the service, an individual drama may have a short playtime from 30 minutes to 2 hours. A game event provides a true multiplayer game where every character in the story is played by a real person, represented by a graphics character. The characters of this social gameplay are allowed to walk around in a virtual environment, chat and interact with each other through a given user interface and chat mechanics. The drama evolves and varies every time to different outcomes.

In the exemplary dramagame, every user participant is given a game character. Throughout the game the game character can select its own actions and reactions, and the user may see results of them in the drama. As discussed above, the set of available actions (interaction functions) for a game character varies according to the game roles and the situation of the storyline, i.e. the states of the state machines of the sub-processes, to which the game character presently participates. Interaction functions may be activated with a combination of available user interface selections that in a jointly indicate an available interaction function to the state machine.

As an example, a game character in a sub-process may have a game role Mark whose objective is to charm a particular girl. In a sub-process, the user of the game character Mark may be provided with objects, like a poem or a book, and some interaction functions, like Read or Give. The user of Mark may select a target, and by selecting in the user display the combination Poem—Read—Linda and pressing OK, the game character Mark will perform an interaction function to read the poem to Linda. This action will change the state of the particular sub-process to a state where reaction of Linda is expected. Linda cannot initiate other activities in the sub-process before Linda responds to Mark, either allowing or declining reading of the poem to her. At the same state Mark waits for a reaction until Linda answers. To expedite the progress of the sub-process, the sub-process may comprise a timer to determine the maximum time after which the state of the state machine updated with a default selection.

Objectives of game roles or characters also tend to intertwine and thereby link sub-processes even if no technical link exists. For example in an exemplary sub-process, a game role John may need to get rid of an object and therefore agree to sign a contract of another sub-process with another game role Ann, if she takes the object from him. Originally the one sub-process applying the object and the other sub-process applying the contract had nothing to do with each other, but the users of the game roles tied them together through their mutual actions.

The described individual actions will advance the given storylines to various directions. The negotiations and talks that happen in between the game characters form an essential part of the gameplay, but actions and reactions provided by interactive functions in sub-processes give storyline type of meaning and structure for the game events.

As discussed above, the interaction functions that the game roles can activate in different states act as dynamically changing rules for the game. A game character in a game role is allowed to do certain actions, and past actions of the game character and/or of other game characters determine what the current state is and therefore what the current rules at that state are.

Let us consider a significantly simplified sub-process with nine states and the rule-sets of its state machine. States numbered XXX, YYY, ZZZ describe possible directions that for conciseness are not described here in writing.

The sub-process involves two different game roles:

A: Nature activist that tries to collect names to a conservation address

B, C: Potential signers.

The sub-process has thus six possible tags:

Address has been signed with name: B, C

Who has written whose name: B:B, B:C, C:C, C:B

In this example, the Boolean existences of these tags define different states. In an exemplary game event, the state machine of the sub-process may progress as follows:

State 1: Beginning
Tags: —
A actions:
Ask signature from B→go to state 2
Ask signature from C→go to state XXX
B and C actions:
none
State 2: A asked B's signature
Tags: —
A actions:
Wait for B's reaction
B actions:
sign→go to state 3
refuse→go to state 1
fake it, sign as somebody else (in this case as C)→go to state 4
C actions:
none, can't interrupt A and B interaction
State 3: B signed as B
Tags: B, B:B
A actions:
ask C to sign→go to state 5
B and C actions:
none
State 4: B faked C's name
(Observe that states 3 & 4 look the same from the users' perspective)
Tags: C, B:C
A actions:
ask C to sign→go to state 6
B and C actions:
none
State 5: B signed, A asked C to sign
Tags: B, B:B
A actions:
Wait for C's reaction
B actions:
none
C actions:
sign→go to state 7
refuse→go to state 3
(No possibility to fake in this case anymore because only 3 people in this example.)
State 6: B faked C, A asked C to sign
Tags: C, B:C
A actions:
Wait for C's reaction
B actions:
none
C actions:
refuse→go to state 4
get angry (because C's name already on list)→(A learns who faked) go to state 4
wipe out own name→go to state 9.
fake, write B's name→go to state 8.
State 7: B signed B, C signed C
Tags: B, C, B:B, C:C
No actions left
State 8: B faked C, C faked B
Tags: B, C, B:C, C:B
No actions left
State 9: B faked C, but C is not listed anymore
Tags: B:C A actions:
Ask B to sign→go to state YYY
Ask C to sign→go to state ZZZ As may be seen, actions of game characters are interaction functions that have the possibility to set tags. When state of the sub-process changes, also actions available to A, B, and C are updated. The sub-process may end when no actions are left.

By dynamically updating the availability of interaction functions, the amount of possible states to manage is significantly reduced without, however, compromising the user experience of interactive control to the game. For example, in the present sub-process, the ongoing interaction between players (A-B, A-C, B-C) also needs to be considered as a state defining element. The total amount of tags is thus nine, and already in this simplistic example, the permutation 9! yields 362880 possible tag combinations. It is easily understood that in any real implementation with conventional state machines, the amount of states soon reaches numbers that would take forever for to construct, store and process.

It is easily seen that in the actual state machine, the amount of states soon reaches numbers that would take forever for a human to construct and the storage requirements would be huge. This is avoided by defining update rules for the actions, i.e. availability of interaction functions to the game characters. The rules may then run realtime in the game server and they define the current state on the fly.

Due to the proposed solution, only 38 states in the exemplary sub-plot are actually reachable by allowed interaction function chains. With four players there are 793 possible states and with 5 players there are 37 001 possible states and so on. The technical advantages of such reduced complexity are easily conceived.

By means of the described process configuration, user experience of each individual game event is unique and the storyline appears to truly progress according activities of all users participating to the game event. Even if the sub-processes do not technically interact with each other, an individual player continuously processes his or her own sub-processes in combination. The state machines of individual sub-processes are by no means trivial, but the amount of complexity remains manageable because the state machines do not need to answer for uncontrollably permutating interactions between the sub-processes. In a sense, a non-linear storyline has thus been achieved by modeling only relevant parts of the storyline. Due to reduced complexity, the development effort for creating the game and computing resources for running the game events are significantly smaller than with the conventional games. Also testing effort required to ensure stable running of the game is considerably smaller, because the tests can be focused only to the limited number of separate sub-process state machines.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A computer implemented process providing an interactive game event of a game for two or more users, the game event forming a shared gameplay that evolves by actions of users participating to the game event, the process comprising:

allocating game characters of the game to the participating users;

initiating in the game event two or more sub-processes configured to progress independently in separate state machines, each of which is responsive to a sub-process specific set of interaction functions;

selecting to each sub-process a group of game characters, wherein at least one game character is selected to at least two simultaneously progressing sub-processes;

providing for activation to the selected game characters a set of allowed interaction functions from the set of interaction functions of each of the sub-processes they are selected to;

changing the state of an ongoing sub-process in response to a selected game character activating an interaction function from its set of allowed interaction functions in that ongoing sub-process;

updating the set of allowed interaction functions of the selected game characters in that ongoing sub-process in response to state change of the sub-process.

2. A computer implemented process according to claim 1, the game event having defined beginning and end points.

3. A computer implemented process according to claim 2, wherein at least one of the defined beginning and end points is timed.

4. A computer implemented process according to claim 1, said process further comprising:
   allocating to game characters selected to a sub-process game roles; and
   applying the game roles to restrict the availability of interaction functions to the game characters.

5. A computer implemented process according to claim 1, wherein the initiating comprises initiating at least part of the sub-processes according to a predefined schedule.

6. A computer program product, readable by a computer and encoding instructions for executing the process of claim 1 in a computer device for providing an interactive game event for two or more users.

7. A game server comprising a processing unit, the processing unit being configured to initiate an interactive game event of a game for two or more users, the game event forming a shared gameplay that evolves by actions of users participating to the game event;

allocate game characters of the game to the users;

initiate in the game event one or more sub-processes configured to progress independently in separate state machines, each of which is responsive to a sub-process specific set of interaction functions;

select to each sub-process a group of game characters, wherein at least one game character is selected to at least two simultaneously progressing sub-processes;

provide for activation to the selected game characters a set of allowed interaction functions from the set of interaction functions of each of the sub-processes they are selected to;

change the state of an ongoing sub-process in response to a selected game character activating an interaction function from its set of allowed interaction functions in that ongoing sub-process;

update the set of allowed interaction functions of the selected game characters in that ongoing sub-process in response to state change of the sub-process.

8. A game server according to claim 7, the processing unit being configured to allocate to game characters selected to a sub-process game roles; and
   apply the game roles to restrict the availability of interaction functions to the game characters.

9. A game server according to claim 7, comprising a ruleset comprising update rules for availability of interaction functions to the game characters in various states of the sub-processes.

10. A game server according to claim 7, wherein the processing unit is configured to initiate at least part of the sub-processes according to a predefined schedule.

* * * * *